(12) United States Patent
Srinivasachar et al.

(10) Patent No.: US 7,981,835 B2
(45) Date of Patent: Jul. 19, 2011

(54) SYSTEM AND METHOD FOR COPRODUCTION OF ACTIVATED CARBON AND STEAM/ELECTRICITY

(75) Inventors: Srivats Srinivasachar, Sturbridge, MA (US); Steven Benson, Grand Forks, ND (US); Charlene Crocker, Newfolden, MN (US); Jill Mackenzie, Carmel, IN (US)

(73) Assignee: Energy & Environmental Research Center Foundation, Grand Forks, ND (US)

( * ) Notice: Subject to any disclaimer, the term of this patent is extended or adjusted under 35 U.S.C. 154(b) by 541 days.

(21) Appl. No.: 12/120,639

(22) Filed: May 14, 2008

(65) Prior Publication Data

US 2009/0317320 A1     Dec. 24, 2009

Related U.S. Application Data

(60) Provisional application No. 60/938,592, filed on May 17, 2007.

(51) Int. Cl.
*C01B 31/08* (2006.01)
*F01K 13/00* (2006.01)
*F01K 17/00* (2006.01)
*C09C 1/56* (2006.01)

(52) U.S. Cl. .......... 502/423; 502/421; 502/432; 60/645; 60/648; 60/676; 423/460

(58) Field of Classification Search .................. 502/423, 502/421, 432; 60/645, 648, 676; 423/460; 422/189, 187, 600, 630, 631
See application file for complete search history.

(56) References Cited

U.S. PATENT DOCUMENTS

| | | | |
|---|---|---|---|
| 3,994,829 A * | 11/1976 | Alford | 502/432 |
| 4,344,821 A * | 8/1982 | Angelo, II | 201/33 |
| 5,089,030 A | 2/1992 | Michel-Kim | |
| 6,298,651 B1 | 10/2001 | Iijima | |
| 6,337,302 B1 | 1/2002 | Teng et al. | |
| 6,911,058 B2 | 6/2005 | Calderon et al. | |
| 2003/0185718 A1* | 10/2003 | Sellakumar | 422/171 |
| 2005/0115870 A1* | 6/2005 | Fukuyama et al. | 208/111.3 |
| 2005/0274307 A1* | 12/2005 | Lissianski et al. | 110/345 |
| 2010/0113267 A1* | 5/2010 | Srinivasachar et al. | 502/421 |

* cited by examiner

*Primary Examiner* — Walter D Griffin
*Assistant Examiner* — Natasha Young
(74) *Attorney, Agent, or Firm* — Conley Rose, P.C.; Rodney B. Carroll

(57) ABSTRACT

A system and method for producing activated carbon comprising carbonizing a solid carbonaceous material in a carbonization zone of an activated carbon production apparatus (ACPA) to yield a carbonized product and carbonization product gases, the carbonization zone comprising carbonaceous material inlet, char outlet and carbonization gas outlet; activating the carbonized product via activation with steam in an activation zone of the ACPA to yield activated carbon and activation product gases, the activation zone comprising activated carbon outlet, activation gas outlet, and activation steam inlet; and utilizing process gas comprising at least a portion of the carbonization product gases or a combustion product thereof; at least a portion of the activation product gases or a combustion product thereof; or a combination thereof in a solid fuel boiler system that burns a solid fuel boiler feed with air to produce boiler-produced steam and flue gas, the boiler upstream of an air heater within a steam/electricity generation plant, said boiler comprising a combustion zone, a boiler-produced steam outlet and at least one flue gas outlet.

10 Claims, 8 Drawing Sheets

SYSTEM AND METHOD FOR COPRODUCTION OF ACTIVATED CARBON AND STEAM/ELECTRICITY

CROSS-REFERENCE TO RELATED APPLICATIONS

The application claims the benefit of U.S. Provisional Application Ser. No. 60/938,592 filed May 17, 2007, herein incorporated by reference in its entirety for all purposes.

STATEMENT REGARDING FEDERALLY SPONSORED RESEARCH OR DEVELOPMENT

This invention was made with government support under Contract Numbers DE-FC26-98FT40320 and DE-FC26-98FT40321 awarded by the United States Department of Energy. The government has certain rights in this invention.

BACKGROUND OF THE INVENTION

1. Field of the Invention

The present invention relates generally to the generation of steam/electricity from a carbonaceous material and the production of activated carbon. Appropriate combination of these two processes provides significant cost savings through requiring fewer pieces of equipment, reducing operating costs, and increasing efficiency between the two processes. A portion of coal processed for a steam/electricity generation plant is diverted to a carbon activation plant thereby reducing equipment costs. A portion of steam produced in the steam/electricity generation plant is directed to the activated carbon plant for steam activation of a carbonized product. A portion of the combustible gases resulting from the carbonization and activation steps of the activated carbon plant is directed back to the steam/electricity plant, e.g. for reburn, and a portion may be recycled for use in the carbonization and/or activation steps. Activated carbon product resulting from the activated carbon production plant may be used, for example, to reduce heavy metal (e.g. mercury) emissions and/or to control $NO_x$ emissions in power plant flue gas, for example, coal-fired power plant flue gas, by contacting the $NO_x$-containing flue gas with activated carbon thereby converting NO to $N_2$.

2. Background of the Invention

Carbon-based sorbents, including activated carbon, are currently used for controlling vapor-phase mercury emissions in coal-fired power plant flue gases. In a typical application, carbon sorbents are injected into the flue gas duct upstream of a particulate removal device such as a fabric filter or an electrostatic precipitator. The activated carbon used for such injection is typically manufactured off-site from carbonaceous materials like coal or coconut shells.

In existing stand-alone activated carbon production plants, an associated boiler generates steam for activating a carbonized material. The typical activated carbon plant generates, from both carbonization and activation steps, product gases which may comprise, for example, hydrocarbons, carbon monoxide, hydrogen, ammonia, hydrogen cyanide, hydrogen sulfide, and combinations thereof. Heat generated from combustion of these gases may be used to make steam in the on-site boiler. The steam may then be directed back to the carbonization and/or activation steps. Depending on regulatory requirements, the resultant flue gas from the boiler must be cleaned to varying degrees before discharge into the atmosphere via a stack.

The current use of separate systems for activated carbon production and energy production is not optimal, requires separate energy production for the operation of duplicate processes, and produces significant pollution as a result of the energy production.

Accordingly, there is an ongoing need for a system and method for the coproduction of activated carbon and steam/electricity.

SUMMARY OF THE INVENTION

Herein disclosed is a method of producing activated carbon comprising carbonizing a solid carbonaceous material to yield a carbonized product and carbonization product gases; activating the carbonized product via activation with steam to yield activated carbon and activation product gases; and utilizing process gas comprising at least a portion of the carbonization product gases or a combustion product thereof; at least a portion of the activation product gases or a combustion product thereof; or a combination thereof, in a solid fuel boiler system that burns a solid fuel boiler feed, wherein the boiler system comprises a boiler upstream of an air heater within a steam/electricity generation plant, said boiler comprising a combustion zone.

In embodiments, the method further comprises burning at least a portion of the activation product gases, at least a portion of the carbonization product gases, or a combination thereof in a gas furnace to yield furnace combustion gas and introducing at least a portion of the furnace combustion gas into the solid fuel boiler system. In embodiments, at least a portion of the furnace combustion gas is introduced into the solid fuel boiler system upstream of the air heater. The furnace combustion gas may be introduced downstream of the combustion zone and upstream of the air heater. In embodiments, at least a portion of the furnace combustion gas is introduced into the solid fuel boiler system upstream of a pollution control device. In embodiments, at least a portion of the furnace combustion gas is introduced into the solid fuel boiler system downstream of the air heater and upstream of a pollution control device. The furnace combustion gas may be introduced to a convective pass section of the boiler. In embodiments wherein the process gas is burned in a gas furnace to yield furnace combustion gas, the process gas may comprise at least a portion of the carbonization product gas.

In some embodiments, the heat input of the at least a portion of the furnace combustion gas introduced into the solid fuel boiler system is greater than about 0.1% and less than about 5% of the total heat input of the steam/electricity generation plant. In some embodiments, the heat input of the at least a portion of the furnace combustion gas introduced into the solid fuel boiler system is greater than 1% and less than about 5% of the total heat input of the steam/electricity generation plant. In embodiments, the at least a portion of the furnace combustion gas introduced into the solid fuel boiler system is greater than about 0.1% and less than about 5% of the total flue gas flowing through the steam/electricity generation plant. In embodiments, the at least a portion of the furnace combustion gas introduced into the solid fuel boiler system is greater than 1% and less than about 5% of the total flue gas flowing through the steam/electricity generation plant. In some embodiments, the heat input of the at least a portion of the furnace combustion gas introduced into the solid fuel boiler system is in the range of from 0.1% to 5%, from 0.3% to 5%, from 0.5% to 5%, from 1% to 5%, from 0.1% to 2%, from 0.3% to 2%, from 0.5% to 2%, from 1% to 2%, from 0.1 to 1%, from 0.3% to 1%, from 0.5% to 1% or may be greater than 1%.

In embodiments, the process gas is introduced into the combustion zone of the solid fuel boiler. In embodiments, the amount of combustion gas produced from combustion of the process gas is greater than about 0.1% and less than about 5% of the total flue gas flowing through the steam/electricity generation plant. In embodiments, the amount of combustion gas produced from combustion of the process gas is greater than 1% and less than about 5% of the total flue gas flowing through the steam/electricity generation plant. In embodiments, the amount of combustion gas produced from combustion of the process gas is in the range of from 0.1% to 5%, from 0.3% to 5%, from 0.5% to 5% from 1% to 5%, from 0.1% to 2%, from 0.3% to 2%, from 0.5% to 2%, from 1% to 2%, from 0.1 to 1%, from 0.3% to 1%, from 0.5% to 1% or may be greater than 1%.

The process gas is sometimes used as a reburn fuel (secondary combustion) to reduce $NO_x$ production from the solid fuel boiler. In embodiments wherein the process gas is used as a reburn fuel, the process gas may comprise at least a portion of the activation product gas. In some embodiments wherein the process gas is used as reburn fuel, the heat input of the process gas used as reburn fuel is greater than about 0.1% and less than about 5% of the total heat input of the steam/electricity generation plant. In some embodiments wherein the process gas is used as reburn fuel, the heat input of the process gas used as reburn fuel is greater than about 1% and less than about 5% of the total heat input of the steam/electricity generation plant. In some embodiments wherein the process gas is used as reburn fuel, the heat input of the process gas used as reburn fuel is in the range of from 0.1% to 5%, from 0.3% to 5%, from 0.5% to 5%, from 1% to 5%, from 0.1% to 2%, from 0.3% to 2%, 0.5% to 2%, from 1% to 2%, from 0.1 to 1%, from 0.3% to 1%, from 0.5% to 1%, or may be greater than 1%.

In embodiments, the method further comprises diverting a portion of the solid fuel from the steam/electricity generation plant for use as solid carbonaceous material. In embodiments, the portion of the solid fuel diverted from the steam/electricity generation plant is greater than about 0.1% and less than about 5% of the solid fuel boiler feed. In embodiments, the portion of the solid fuel diverted from the steam/electricity generation plant is greater than about 0.3% and less than about 5% of the solid fuel boiler feed. In embodiments, the portion of the solid fuel diverted from the steam/electricity generation plant is greater than about 1% and less than about 5% of the solid fuel boiler feed. In embodiments, the portion of the solid fuel diverted from the steam/electricity generation plant is in the range of from 0.1% to 5%, from 0.3% to 5%, 0.5% to 5%, from 1% to 5%, from 0.1% to 2%, from 0.3% to 2%, from 0.5% to 2%, from 1% to 2%, from 0.1 to 1%, from 0.3% to 1%, from 0.5% to 1%, or may be greater than 1%.

In specific embodiments of the disclosed method, the solid carbonaceous material comprises coal. In embodiments, the solid carbonaceous material further comprises biomass. In some embodiments, the solid carbonaceous material comprises coal, biomass, or a combination thereof, the solid fuel boiler feed comprises coal, biomass, or a combination thereof, and the portion of the solid fuel diverted from the steam/electricity generation plant for use as solid carbonaceous material is in the range of from 0.1% to 5%, from 0.3% to 5%, from 0.5% to 5%, from 1% to 5%, from 0.1% to 2%, from 0.3% to 2%, from 0.5% to 2%, from 1% to 2%, from 0.1 to 1%, from 0.3% to 1%, from 0.5 to 1%, or may be greater than 1%.

In some embodiments, the solid carbonaceous material is coal and/or biomass, the solid fuel boiler feed comprises coal and/or biomass, and the portion of the solid fuel diverted from the steam/electricity generation plant for use as solid carbonaceous material comprises greater than 1% and less than about 5% of the solid fuel boiler feed, alternatively, greater than 0.3% and less than 5%. In some embodiments, the solid carbonaceous material is coal and/or biomass, the solid fuel boiler feed comprises coal and/or biomass, and the portion of the solid fuel diverted from the steam/electricity generation plant for use as solid carbonaceous material is in the range of from 0.1% to 5%, from 0.3% to 5%, from 0.5% to 5%, from 1% to 5%, from 0.1% to 2%, from 0.3% to 2%, from 0.5% to 2%, from 1% to 2%, from 0.1 to 1%, from 0.3% to 1%, from 0.5 to 1%, or may be greater than 1%.

In embodiments, the solid carbonaceous material comprises lignite. The lignite may have a base to acid ratio greater than or equal to about 0.4 and an ash content of less than or equal to about 15%.

Steam for the activation of the carbonized product may be diverted from the steam produced in the steam/electricity generation plant. The diverted steam stream may comprise less than about 5% of the steam generated in the steam/electricity generation plant. Alternatively, the diverted steam stream may comprise greater than 0.1% and less than about 5%; greater than 0.3% and less than about 5%; greater than 0.5% and less than about 5%, greater than 1% and less than about 5%; greater than 0.1% and less than 2%; greater than 0.3% and less than 2%, greater than 0.5% and less than 2%, or greater than 1% and less than 2% of the steam generated in the steam/electricity generation plant.

The steam/electricity generation plant may further comprise pollution control equipment and the pollution control equipment of the steam/electricity generation plant may be used to remove pollutants from the process gas. A portion of the activated carbon produced via the disclosed method may be injected into a flue gas of the steam/electricity generation plant to reduce $NO_x$ emissions therefrom. The method of producing activated carbon may further comprise removing fines from the process gas. Fines removed from the process gas may be recycled to the activating or carbonizing steps of the method.

A fraction of the carbonized product (char) may be introduced into the boiler to increase heat production and/or reduce $NO_x$ emissions.

The method may further comprise recycling a portion of the process gas to the activating step, the carbonizing step or both, wherein combustion of said process gas is used to generate heat.

In embodiments, the carbonization zone and the activation zone are distinct zones within a single unit. In embodiments, the single unit comprises a multiple hearth reactor. In alternative embodiments, the carbonization zone and the activation zone are in separate reactors. In some embodiments wherein the carbonization zone and the activation zone are in separate reactors, the separate reactors comprise rotary kilns.

In embodiments, the solid carbonaceous material is in the carbonization zone for a residence time and the carbonization product gases are in the carbonization zone for a residence time, and the residence time of the solid carbonaceous material in the carbonization zone is greater than the residence time of the carbonization product gases in the carbonization zone. In embodiments, the carbonized product is in the activation zone for a residence time and the activation product gases are in the activation zone for a residence time, and the residence time of the carbonized product in the activation zone is greater than the residence time of the activation product gases in the activation zone.

In embodiments, the activated carbon has a surface area greater than about 400 $m^2/g$.

Also disclosed is a system for the coproduction of activated carbon and boiler-produced steam, the system comprising: a boiler in which a solid fuel from a solid fuel source is thermally converted via combustion with air to produce boiler-produced steam and flue gas, the boiler comprising a boiler-produced steam outlet and at least one flue gas outlet; an activated carbon production apparatus, the activated carbon production apparatus comprising a carbonization zone in which a carbonaceous material is carbonized to produce carbonization gases and char, the carbonization zone comprising carbonaceous material inlet, a char outlet and a carbonization gas outlet; and an activation zone in which char is activated with activation steam to produce activated carbon and activation gases, the activation zone comprising an activated carbon outlet, an activation gas outlet, and an activation steam inlet. In embodiments, solid fuel comprises coal, biomass, or a combination thereof. In embodiments, the coal is lignite. In embodiments, the lignite comprises a base to acid ratio of greater than or equal to about 0.4 and an ash content of less than or equal to about 15%.

In some embodiments of the system, the carbonization zone and the activation zone are distinct zones within the same reactor. In this case, the reactor may be a multiple hearth furnace. In alternative embodiments of the system, the carbonization zone and the activation zone are in separate reactors. In this case, the system may comprise at least one rotary kiln.

The system may further comprise an activated carbon inlet whereby a portion of the activated carbon is injected into the flue gas. In embodiments of the system, the boiler-produced steam outlet and the activation steam inlet are fluidly connected, whereby a portion of the boiler-produced steam may be introduced into the activation zone. In some embodiments, the system further comprises piping connecting the solid fuel source to the carbonaceous material inlet, whereby a portion of the solid fuel source may be introduced into the carbonaceous material inlet.

The present invention comprises a combination of features and advantages which enable it to overcome various problems of prior devices and methods. The various characteristics described above, as well as other features, will be readily apparent to those skilled in the art upon reading the following detailed description of the preferred embodiments of the invention, and by referring to the accompanying drawings.

BRIEF DESCRIPTION OF THE DRAWINGS

For a more detailed description of the preferred embodiment of the present invention, reference will now be made to the accompanying drawings, wherein.

NOTATION AND NOMENCLATURE

As used herein, the term "carbonization" refers to the devolatilization of an organic feedstock to yield carbonization gas and solid carbonized product, i.e. char.

Where not stated otherwise, percentages presented herein are weight percentages.

DETAILED DESCRIPTION

I. Overview

Herein disclosed are a system and method for combining the production of activated carbon with the generation of steam/electricity from a solid fuel boiler system. The disclosed combination may enable cost savings for the carbon activation process, the steam/electricity generation processes, or both. Steam generated by the steam/electricity generation plant may be used in the activation of the carbonized product produced in the activated carbon production apparatus (ACPA). Gases resulting from the activated carbon production apparatus may be used as fuel for steam creation, reused in activation and carbonization processes, used in solid fuel (e.g., coal) heating and/or drying, used as reburn fuel in the steam/electricity generation plant, and/or burned in an aftercombustor, as further described hereinbelow. The activated carbon produced may be used to advantage to reduce the level of a contaminant, e.g. $NO_x$ and/or heavy metal (e.g., mercury) level, from the flue gases from the boiler, as discussed further hereinbelow.

The disclosed system and method simplify the production of activated carbon: the disclosed system and method may minimize the equipment required for the manufacture of activated carbon, may reduce production costs by minimizing raw carbonaceous material handling and processing, reduces the need for supplemental fuel within the activated carbon production process, eliminates the need for stand-alone steam-generating equipment for the activated carbon production process, eliminates the need for stand-alone pollution control equipment dedicated to the activated carbon production process, and produces a high-heating-value char that may be co-fired within the power plant and/or put to use in $NO_x$ reduction technologies.

Figure 1:
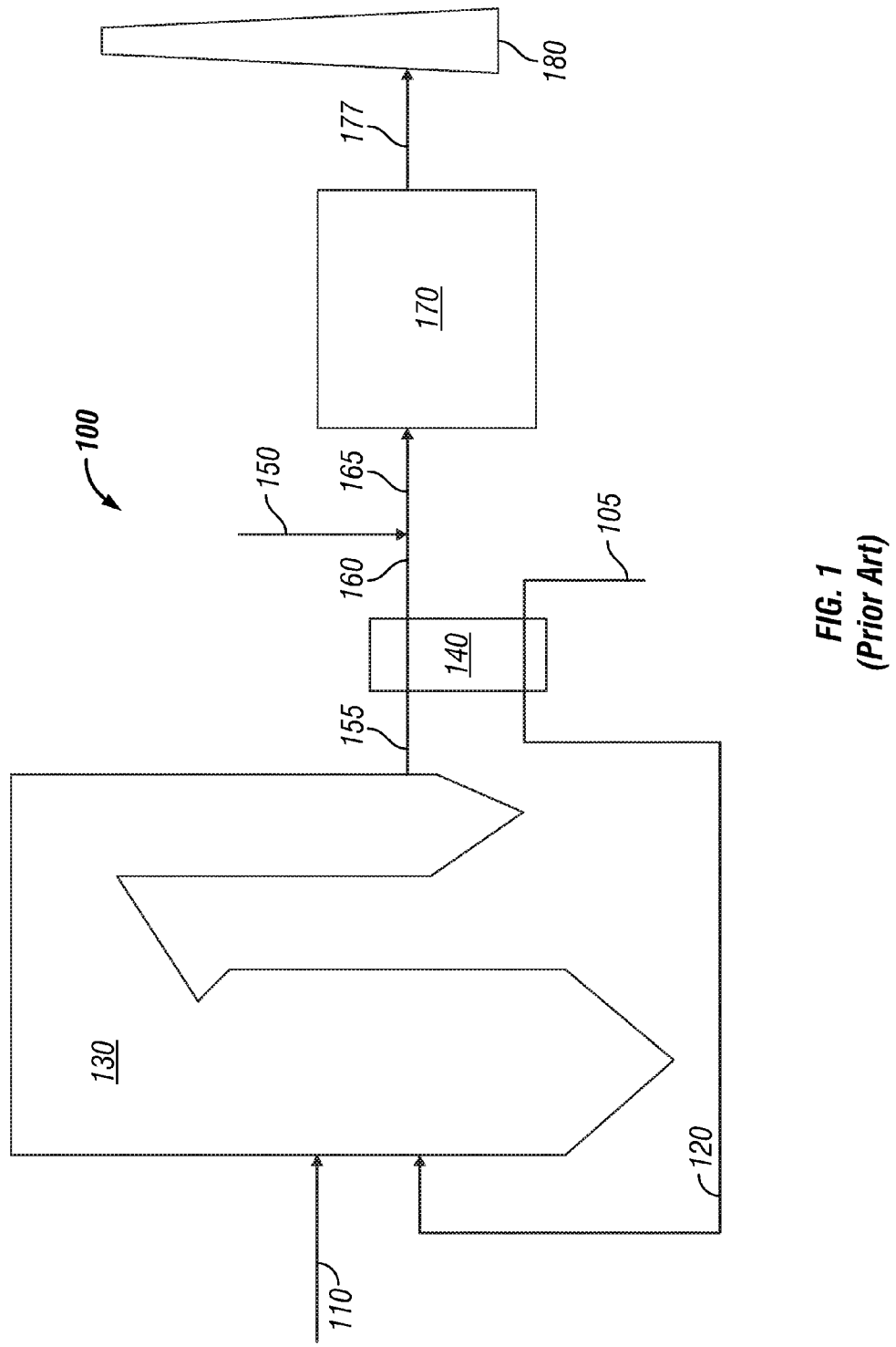
FIG. 1 is a schematic of a typical configuration for carbon injection in a coal-fired power plant.

FIG. 1 is a schematic of a typical configuration for carbon injection in a coal-fired power plant 100. Air 105 is heated via air heater 140 to yield heated air 120. Heated air 120 and coal 110 enter boiler 130, where combustion occurs. Hot flue gas 155 is used to heat air 105 in heat exchanger 140, yielding heat-exchanged flue gas 160. Activated carbon 150 is injected into heat-exchanged flue gas 160 or hot flue gas 155 entering air heater 140 or earlier in boiler 130 to reduce $NO_x$ or heavy metal content therein. The contaminant-reduced flue gas 165 is sent to particulate separation device 170 wherein particles escaping boiler 130 are removed to yield particulate-reduced flue gas 177 which is sent to stack 180 for disposal.

As mentioned above, the presently disclosed system integrates two production systems, namely a system for the production of activated carbon and a system for the generation of steam/electricity from a carbonaceous material such as coal. By integrating these two systems, significant cost savings may be achieved both in terms of a decrease in equipment requirements, as well as a potential reduction of operating costs.

System

Details of the integration of a carbonaceous fuel (e.g., coal)-fired steam/electricity plant and activated carbon production plant will now be made with reference to FIG. 2 which is schematic of an embodiment of an integrated system according to the present disclosure for the coproduction of activated carbon and steam/electricity, with product gas from the activated carbon production directed to a combustor/boiler of the steam/electricity generation plant. While FIG. 2 and the following discussion describe a coal-fired boiler, it is to be understood that steam/electricity generation plant 295 may comprise any solid fuel boiler compatible with the disclosed system and methods.

Integrated system 250 integrates steam/electricity generation plant (hereinafter SEGP) 295 and activated carbon production plant (hereinafter ACPP) 215. SEGP 295 comprises boiler 230. Boiler 230 comprises an inlet for inlet coal 210, an inlet for air 220, an inlet for boiler feedwater 232, an outlet for boiler-produced steam 233, and at least one outlet for flue gas 255 produced in boiler 230. SEGP 295 also comprises an inlet for activated carbon 245, whereby activated carbon is intimately mixed with flue gas to reduce the level of at least one contaminant therein.

SEGP 295 may further comprise coal-handling apparatus, such as, by way of non-limiting example, coal source/storage 201, coal crushing apparatus 202, conveyor 203, and grinder 204a. In embodiments, SEGP 295 further comprises heat exchanger 240 wherein air 205 is heated via heat exchange in air heater 240 with hot flue gas 255 exiting boiler 230 via the outlet for flue gas 255. SEGP may further comprise at least one steam turbine 235 for the production of electricity. SEGP 295 may further comprise apparatus for cleaning flue gas 255 prior to introduction of the flue gas to a stack 280. Such apparatus may be any apparatus known to those of skill in the art, and may comprise, for example, at least one activated carbon inlet for introducing activated carbon 245 into the flue gas, particulate collection device 270, and $SO_2$ scrubber 275, as shown in FIG. 2. Preferably, the at least one inlet for activated carbon 245 is upstream of particulate collection device 270. In the embodiment of FIG. 2, activated carbon 245 is injected into heat exchanged flue gas stream 260 to produce contaminate reduced flue gas stream 265. Alternatively or additionally, activated carbon 245 may be introduced into hot flue gas 255.

ACPP 285 comprises activated carbon production apparatus ACPA 211. ACPA 211 comprises carbonization zone 208 in which carbonaceous material is carbonized to produce carbonization gases and solid carbonized product, the carbonization zone comprising an inlet for ACPP inlet stream 206, a carbonized product outlet and a carbonization gas outlet; and an activation zone 209 in which carbonized product from the carbonization zone is activated with diverted steam 237 to produce activated carbon 213 and activation gases, the activation zone comprising an outlet for activated carbon 213, an outlet for activation gas, and an inlet for diverted steam stream 237. In embodiments, the outlet for steam 233 from SEGP 295 is fluidly connected to the inlet for diverted steam 237 of ACPA 211, whereby a portion of steam 233 may be used to activate carbonized product from carbonization zone 208. In embodiments, coal source 201 is connected with the inlet for ACPP inlet stream 206, whereby a portion of coal from coal source 201 may be diverted for use as carbonaceous material in ACPP 285.

ACPP 285 may further comprise gas/solids separator 215 fluidly connected to the outlet for carbonization gases, the outlet for activation gases, or both, whereby fines may be removed from the carbonization and/or activation gases. All or a portion of the fines-reduced gases 239 or boosted product gas 239a may subsequently be recycled via piping as ACPA product gas recycle stream 217 to ACPA 211. A stream divider may be used split ACPA product gas recycle stream 217 into recycle combustion streams 227, 228, and 229 with all or none of stream 217 being introduced into drying zone 207, carbonization zone 208, and/or activation zone 209 via product gas recycle combustion streams 227, 228, and/or 229 respectively.

Figure 3:
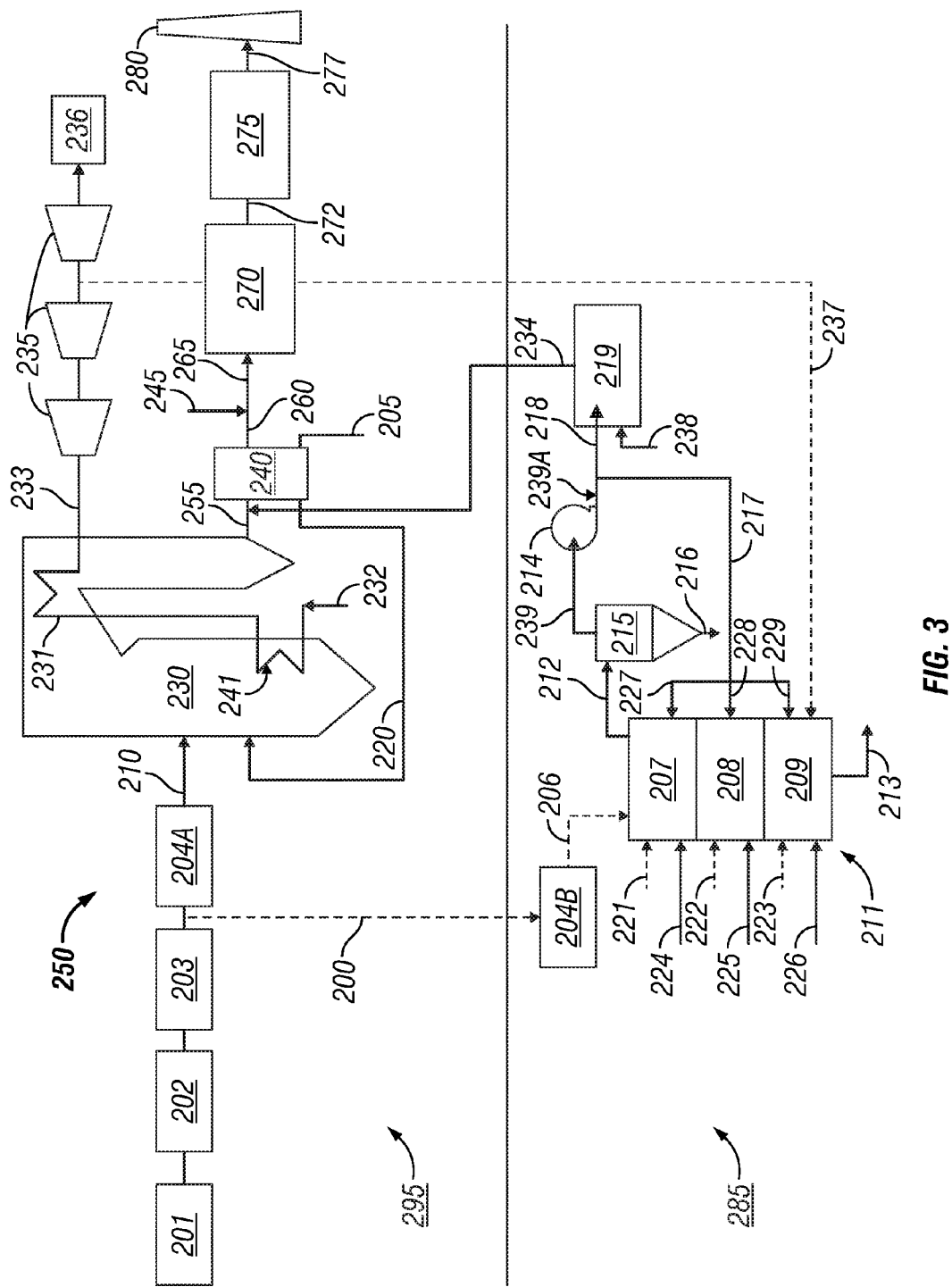
FIG. 3 is a schematic of another embodiment according to the present disclosure of a system for the coproduction of activated carbon and steam/electricity, with product gas from the activated carbon plant directed to an aftercombustor and gases from the aftercombustor sent downstream of the combustor/boiler of a steam/electricity generation plant, e.g. upstream of flue gas cleaning unit(s) of the steam/electricity generation plant.

In embodiments, SEGP 295 comprises an inlet in fluid communication with ACPA 211 whereby all or a portion of the gases separated in separator 215 are sent to boiler 230 as known to those of skill in the art. In some embodiments further discussed hereinbelow, ACPP 285 further comprises aftercombustor 219, as shown in FIG. 3, wherein all or a portion of the gases separated in separator 215 (and making up fines-reduced product gas 239 or boosted product gas 239a) are combusted. In embodiments, aftercombustor 219 is in fluid communication with SEGP 295, whereby at least a portion of gases produced in aftercombustor 219 are introduced into the flue gas from boiler 230. In embodiments, as shown in FIG. 3, at least a portion of aftercombustor gas 234 produced in aftercombustor 219 is introduced into the flue gas. In embodiments, at least a portion of aftercombustor gas 234 is introduced into the flue gas upstream of air heater 240. In alternative embodiments, at least a portion of gases produced in aftercombustor 219 are introduced into the flue gas downstream of air heater 240. The boiler flue gas treatment apparatus of SEGP 295 may thus be used to clean gases produced in ACPA 211. In embodiments, at least a portion of combusted gas 234 is introduced into a combustion zone of boiler 230, for example, to take advantage of the radiative heat transfer surface in boiler 230. In some embodiments, at least a portion of the furnace combustion gas 234 is introduced into the solid fuel boiler system upstream of at least one pollution control device. In embodiments, at least a portion of the furnace combustion gas is introduced into the solid fuel boiler system downstream of the air heater and upstream of a pollution control device.

The system will be described in more detail during the following discussion of the method for the coproduction of activated carbon and steam/electricity.

Method

Raw Material/Coal Handling

Boiler inlet coal 210 for use in SEGP 295 may be taken from coal source 201, crushed in coal crusher 202, and conveyed via conveyor 203 to coal grinding 204a. The disclosed system and method for operation of an integrated system or plant for the coproduction of activated carbon and steam/electricity, hereinafter IP 250, take advantage of the coal-handling infrastructure of steam/power plant 295. In stand-alone ACPPs, coal is delivered, stored, precrushed, and conveyed to a feed storage bin before being reduced to the final size in a device such as a hammer mill. In FIG. 2, after it has been delivered, stored, and precrushed, in embodiments, a portion of coal from coal source 201 is diverted via diverted coal stream 200 from steam/power plant conveyor 203 to ACPP 285.

In embodiments, the coal is lignite. A suitable coal is a lignite such as Center lignite, described in Example 1 hereinbelow. Desirable lignites for the production of high surface area activated carbon have high base to acid ratios on low ash contents. In embodiments, the lignite has an ash content (expressed as weight % on an as-fired basis) of less than about 15%. In embodiments, the lignite has an ash content (expressed as weight % on an as-fired basis) of less than about 10%. In embodiments, the coal comprises lignite, and the lignite has a base to acid ratio of greater than about 0.4. In embodiments, the coal comprises lignite, and the lignite has a base to acid ratio of greater than about 0.5. In embodiments, the coal comprises lignite, and the lignite has a base to acid ratio of greater than about 0.6. In some embodiments, the coal is lignite, and the lignite has a base to acid ratio greater than about 0.4 and an ash content of less than about 15%. In embodiments, the coal has a high alkali and alkaline earth element content. In embodiments, the lignite has an average sodium content (expressed as weight percent of equivalent oxide, $Na_2O$, in the as-fired coal ash) of greater than about 3.5%, alternatively greater than about 5%, alternatively about 5.5%. In embodiments, the lignite has an average calcium content (expressed as weight percent of equivalent oxide, CaO, in the as-fired coal ash) of greater than about 10%.

In embodiments, formation of activated carbon 213 via ACPP 285 is incorporated into the operation of an existing SEGP. In order to stay within the flow of existing operation of an SEGP 295, in embodiments, the amount of coal diverted via diverted coal stream 200 is small enough that operation of the SEGP is not significantly affected by the production of activated carbon. In embodiments, the amount of coal diverted via diverted coal stream 200 is less than about 5% of the feed to the SEGP plant. In other embodiments, the amount of coal diverted via diverted coal stream 200 is less than about 3% of the feed to the steam/power plant. In still other embodiments, the amount of coal diverted via diverted coal stream 200 is less than about 2% of the feed going to the steam/power plant. In embodiments, the amount of coal diverted via diverted coal stream 200 is greater than about 0.1% of the feed to the SEGP plant. In embodiments, the amount of coal diverted via diverted coal stream 200 is greater than about 0.3% of the feed to the SEGP plant. In embodiments, the amount of coal diverted via diverted coal stream 200 is greater than about 0.5% of the feed to the SEGP plant. In embodiments, the amount of coal diverted via diverted coal stream 200 is greater than 1% of the feed to the SEGP plant. In embodiments, the amount of coal diverted via diverted coal stream 200 is in the range of greater than about 0.1% of the feed to the SEGP plant and less than or equal to about 5% of the feed to the SEGP plant. In embodiments, the amount of coal diverted via diverted coal stream 200 is in the range of greater than 0.3% of the feed to the SEGP plant and less than or equal to about 5% of the feed to the SEGP plant. In embodiments, the amount of coal diverted via diverted coal stream 200 is in the range of greater than 1% of the feed to the SEGP plant and less than or equal to about 5% of the feed to the SEGP plant.

Grinder 204b may be used to further reduce the size of coal in diverted coal stream 200 prior to carbonization. ACPP inlet stream 206 comprises solid carbonaceous material. In embodiments, ACPP inlet stream 206 comprises coal having an average diameter of less than about 5". In other embodiments, ACPP inlet stream 206 comprises coal having an average diameter of less than about 3". In still other embodiments, ACPP inlet stream 206 comprises coal having an average diameter of less than about 1". In embodiments, ACPP inlet stream 206 comprises coal having an average diameter of from about 0.001 inch to about 5 inches.

ACPP inlet stream 206 may comprise biomass in addition to or in place of the primary coal source to SEGP 295. Suitable biomass includes, but is not limited to wood, sunflower hulls, peat, coconut shells, and combinations thereof. In specific embodiments, inlet stream 206 comprises sunflower hulls. Depending on sources of additional biomass, biomass may be mixed with diverted coal stream 200 prior to grinder 204b, mixed downstream of grinder 204b, introduced into drying zone 207 of activated carbon production reactor 211, introduced into carbonization zone 208 of activated carbon production reactor 211, introduced into activation zone 209 of activated carbon production reactor 211, or a combination thereof (biomass introduced via additional carbonaceous material inlets (not shown)). In embodiments, ACPP inlet stream 206 comprises additional biomass mixed with coal from diverted coal stream 200. In embodiments, inlet stream 206 comprises about 50 weight percent biomass and about 50 weight percent lignite diverted from SEGP 295. Without wishing to be limited by theory, the use of biomass in ACPP 211 may be beneficial to IP 250 because it is a renewable energy resource and is $CO_2$ neutral. For example, biomass may not be usable in the SEGP due to difficulty in feeding the biomass to the boiler. It may also not be desirable to feed biomass directly into boiler 230 due to detrimental impacts that may result from the combustion of the biomass in the boiler 230, such as ash deposition on boiler heat transfer. Such biomass may, in embodiments, be conveniently supplied to ACPA 211, where a significant portion of its heating value may be transferred to the product gases 218 and subsequently routed to SEGP 295 as additional fuel ($CO_2$-neutral) to, for example, boiler 230.

Steam/Electricity Generation Plant

Within SEGP 295, boiler inlet coal 210 is thermally converted (combusted) in boiler 230 with heated air 220. Heat exchanger 241 is used to heat boiler feedwater 232 and produce steam 233. Heat exchanger 241 contains boiler feedwater 232 that leaves boiler 230 as steam 233. To produce electricity, steam 233 passes through one or more (three shown in FIG. 2) steam turbines 235 which may be upstream of condenser 236.

Hot flue gas 255 is cooled via radiative heat exchange, convective heat exchange in convective pass 231 and air heater 240. Prior to disposal via stack 280, flue gas may be treated, as is well known to those of skill in the art. Such treatment may include, but is not limited to, $NO_x$ reduction, particulate reduction, and removal of sulfur or other contaminants. In FIG. 2, the content of one or more contaminants of flue gas, including but not limited to mercury, $NO_x$, and sulfur is reduced by injection of powdered activated carbon 245, as known to those of skill in the art.

At least a portion of powdered activated carbon (PAC) 245 is produced in IP 250 as further described hereinbelow. In embodiments, PAC 245 is injected into flue gas having a temperature of from about 204° C. (400° F.) to about 43° C. (110° F.). In embodiments, PAC 245 is injected upstream of heat exchanger 240 into flue gas 255. In embodiments, flue gas 255 has a temperature of from about 204° C. (400° F.) to 482° C. (900° F.). In embodiments, PAC 245 is injected downstream of heat exchanger 240 into heat-exchanged flue gas 260. In embodiments, heat-exchanged flue gas 260 has a temperature of from about 93° C. (200° F.) to 204° C. (400° F.). In FIG. 2, contaminant-reduced, e.g. $NO_x$-reduced, flue gas 265 is sent to particulate collection device 270 wherein particulates escaping boiler 230 are removed. In the embodiment in FIG. 2, particulate-reduced flue gas 272 is sent to $SO_2$ scrubber 275 wherein sulfur is removed from particulate-reduced flue gas 272. Sulfur-reduced flue gas 277 is sent to stack 280 for disposal.

Activated Carbon Production Plant

ACPP 285 produces activated carbon product in activated carbon product stream 213 and product gases 212. Within ACPP 285 of IP 250, carbonization occurs within carbonization zone 208 and activation in activation zone 209. The method may further comprise drying (and/or heating) of ACPP inlet stream 206 in drying zone 207. ACPP 285 generates product gases 212 from both the (distinct) carbonization and activation steps, product gases comprising, without limitation, hydrocarbons, carbon monoxide, hydrogen, ammonia, hydrogen cyanide, and hydrogen sulfide. In embodiments, carbonization and steam activation are carried out in different pieces of equipment. Alternatively, in embodiments, carbonization and steam activation are carried out in different zones within the same piece of equipment, as in the embodiments of FIGS. 2 and 3. For example, in embodiments, drying, carbonization, and activation are carried out within a multiple hearth reactor, with separate hearths used for drying zone 207, carbonization zone 208, and activation zone 209. In embodiments, each of zones 207, 208, and 209 may comprise more than one hearth of a multiple hearth furnace (MHF). It is to be understood, however, that drying, carbonization, and activation may be carried out in separate pieces of equipment, or within a single piece of equipment. For example, drying and carbonization may occur in one unit, with activation being performed in a separate unit, as known to those of skill in the art. In embodiments, drying, carbonization, and activation take places in three separate units. For example, in an embodiment, drying, carbonization, and activation take place in a plurality of rotary kilns. In embodiments, ACPA 211 comprises at least one rotary kiln. In embodiments, ACPA 211 comprises three rotary kilns in series. In some embodiments in which the use of a renewable carbonaceous material to decrease $CO_2$ emissions is beneficial to SEGP 295, the solid carbonaceous material used in ACPP 285 comprises biomass, as mentioned hereinabove. The use of a MHF or serial rotary kilns may allow easier thermal conversion of biomass relative to a burner, as the MHF and rotary kilns may be more readily adaptable to potential inhomogeneity and physical characteristics of the biomass. A majority of the energy of a biomass can thus be transferred to SEGP 295 via the disclosed system and method, as described in more detail hereinbelow.

Drying Zone

Figure 2:
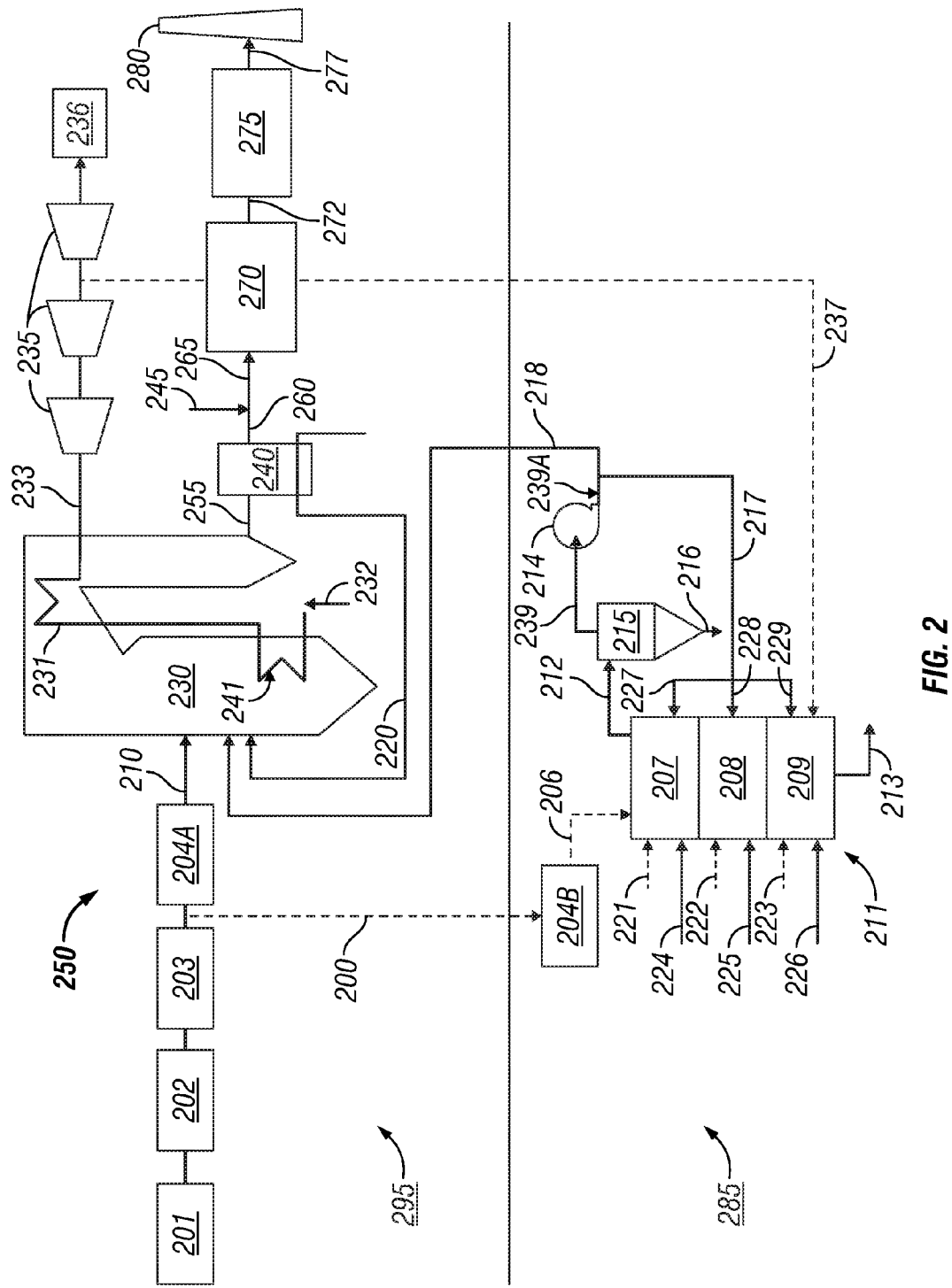
FIG. 2 is a schematic according to the present disclosure of an embodiment of a system for the coproduction of activated carbon and steam/electricity, with product gas from the activated carbon production plant directed to the combustor/boiler of a steam/electricity generation plant.

In FIG. 2, ACPA 211 comprises drying zone 207 wherein the moisture content of ACPP inlet stream 206 is reduced. In embodiments, the temperature of gases in the drying zone 207 is from about 93° C. (200° F.) to about 704° C. (1300° F.). In embodiments, the residence time of the solid material in drying zone 207 is from about 5 minutes to about 30 minutes. In embodiments, drying zone 207 yields a solid carbonaceous material having a moisture content of from about 0.1% to about 5%.

Carbonization Zone

In FIG. 2, activated carbon production reactor (ACPA) 211 comprises carbonization zone 208 wherein pyrolysis of solid carbonaceous material occurs. Pyrolysis (devolatization) of the carbonaceous material yields carbonization product gas (released volatiles) and solid carbonized product (char). In embodiments, the temperature of carbonization zone 208 is from about 315° C. (600° F.) to about 760° C. (1400° F.); alternatively, the temperature of carbonization zone 208 is from about 426° C. (800° F.) to about 760° C. (1400° F.); alternatively, the temperature of carbonization zone 208 is about 648° C. (1200° F.). In embodiments, the residence time of the solid material in carbonization zone 208 is from about 5 minutes to about 1 hour. Preferably, from about 10 minutes to about 30 minutes. In embodiments, the residence time of product gas in carbonization zone 208 is from about 1 second to about 20 seconds. In embodiments, the residence time of the solid carbonaceous material in carbonization zone 208 is one order of magnitude greater than the residence time of the gas in carbonization zone 208 (i.e., the solid carbonaceous material is not substantially entrained in the gas). In embodiments, the residence time of the solid carbonaceous material in carbonization zone 208 is 1.5 orders of magnitude greater than the residence time of the gas in carbonization zone 208 (i.e., the solid carbonaceous material is not entrained in the gas). In embodiments, carbonization zone 208 yields a carbonized product (char) having a surface area of from about 100 $m^2/g$ to about 400 $m^2/g$.

Activation Zone

In FIG. 2, activated carbon production apparatus (ACPA) 211 comprises activation zone 209 wherein steam activation (i.e. gasification) of the solid char from carbonization zone 208 occurs. In embodiments, the carbonized material is activated substantially without cooling the carbonized material prior to activation. In activation zone 209, char reacts with steam 237 to produce activation product gases comprising carbon monoxide and hydrogen, as well as activated carbon product 213. In embodiments, the temperature of activation zone 209 is from about 600° C. (1112° F.) to about 1000° C. (1832° F.). In some embodiments, the temperature of activation zone 209 is about 875° C. (1607° F.). In embodiments, the residence time of the solid material in activation zone 209 is from about 10 minutes to about 3 hours. Alternatively, from about 30 minutes to about 2 hours. In embodiments, the residence time of the solid material in activation zone 209 is greater than 1 minute. In embodiments, the residence time of the solid material in activation zone 209 is greater than 10 minutes. In embodiments, the residence time of the solid material in activation zone 209 is greater than 30 minutes. In embodiments, the residence time of the solid material in activation zone 209 is greater than 60 minutes. In embodiments, the residence time of the solid material in activation zone 209 is greater than 90 minutes. In embodiments, the residence time of product gas in activation zone 209 is from about 5 seconds to about 120 seconds; in alternative embodiments, the residence time of product gas in activation zone 209 is from about 5 seconds to about 60 seconds. In embodiments, the residence time of the solid material in activation zone 209 is at least one order of magnitude greater than the residence time of the gas in activation zone 209 (i.e., the solid material is not substantially entrained in the gas). In embodiments, the residence time of the solid material in activation zone 209 is at least 1.5 orders of magnitude greater than the residence time of the gas in activation zone 209 (i.e., the solid material is not entrained in the gas). In embodiments, activation zone 209 yields an activated carbon or granular activated carbon (GAC) product having a surface area greater than about 400 $m^2/g$. In embodiments, activation yields an activated carbon or granular activated carbon (GAC) product having a surface area greater than about 450 $m^2/g$. In embodiments, activation zone 209 yields an activated carbon or granular activated carbon (GAC) product having a surface area greater than about 500 $m^2/g$. In embodiments, activation zone 209 yields an activated carbon or granular activated carbon (GAC) product having a surface area greater than about 600 $m^2/g$. In embodiments, activation zone 209 yields an activated carbon or granular activated carbon (GAC) product having a surface area greater than about 700 $m^2/g$.

Activated Carbon or Granular Activated Carbon

The activated carbon or GAC in GAC product stream 213 may be further treated prior to injection into flue gas of SEGP 295. Excess activated carbon or GAC may be transported to other locations for use or sale. For example, activated carbon GAC may be powdered further for better entrainment when injected into a flue gas. In embodiments, the activated carbon or GAC may be further treated as known to those of skill in the art, to enhance the ability of the activated carbon to remove specific contaminants from the flue gas, for example, a halogen may be deposited on the surface thereof to enhance the removal of mercury via adsorption with the treated activated carbon or GAC.

Steam activation, carbonization and raw material drying and heating are endothermic processes. In stand-alone ACPPs, additional fuel (typically gaseous or liquid) is combusted in the pieces of equipment performing these endothermic steps. The need for additional fuel may increase production costs in stand-alone ACPPs relative to the presently disclosed integrated plant and method, wherein product gases produced in carbonization and/or activation may be recycled and combusted to produce heat for the endothermic steps.

Steam Process

Steam is required for activation of the carbonized material produced via carbonization in 208. For a 50-ton-per-day plant, a typical amount of steam required is 5000 lb/hr. In a stand-alone ACPP, the requisite steam is generated in a separate boiler wherein the combustible gases from the carbonization and steam activation steps are burned. The corresponding heat input required may be about 6 MMBtu/hr. In the prior art, the diversion and use of the product gases from the carbonization and activation steps for steam generation results in a smaller proportion of these combustible gases available for other parts of the process, such as for providing heat within the carbonization and activation steps.

In embodiments of IP 250, a portion of steam 233 produced in the steam/electricity generation plant is used for activation of the carbonized material. In FIG. 2, a portion of the steam 233 produced in SEGP 295 is diverted via diverted steam stream 237 to ACPP 285 for steam activation of the carbonized product. Since steam need not be manufactured by the activated carbon plant, no separate boiler dedicated to activated carbon production is needed in the disclosed IP 250. Furthermore, combustible gases 212 from the carbonization and/or activation steps are fully available for combustion in and providing heat for further activation and carbonization as well as for use in the steam/electricity generation steps, as further discussed hereinbelow.

In embodiments such as the embodiment of FIG. 2, diverted steam 237 is diverted from the intermediate-pressure turbine exhaust. In embodiments, diverted steam 237 has a pressure greater than about 1 bar to facilitate transport from SEGP 295 to ACPP 285 and to overcome any transportation, distribution, and injection pressure drops. In embodiments, the amount of steam diverted from SEGP 295 via diverted steam 237 is greater than about 0.1% of steam 233 generated in SEGP 295. In embodiments, the amount of steam diverted from SEGP 295 via diverted steam 237 is greater than about 0.3% of steam 233 generated in SEGP 295. In embodiments, the amount of steam diverted from SEGP 295 via diverted steam 237 is greater than about 0.5% of steam 233 generated in SEGP 295. In embodiments, the amount of steam diverted from SEGP 295 via diverted steam 237 is less than about 5% of steam 233 generated in SEGP 295. In some embodiments, the amount of steam diverted from SEGP 295 via diverted steam 237 is less than 2% of steam 233 generated in SEGP 295. In embodiments, the amount of steam diverted from SEGP 295 via diverted steam 237 is less than 1% of steam 233 generated in SEGP 295. In embodiments, the amount of steam diverted from SEGP 295 via diverted steam stream 237 is in the range of from 0.1% to about 5%; from 0.3% to about 5%; from 0.5% to about 5%; from 1% to about 5%; from 0.1% to about 2%; from 0.3% to about 2%; from 0.5% to about 2%; or from 1% to about 2% of the steam 233 generated in SEGP 295.

Product Gases from Activated Carbon Plant

In the embodiment of FIG. 2, hot product gases from the activation in activation zone 209 are directed to the carbonization step in carbonization zone 208, the solids and product gases flowing in countercurrent fashion, and the final product gases 212 leave carbonization zone 208. In other embodiments, the solids and the product gases may flow in a co-current fashion for both a rotary kiln and a multiple hearth furnace. In embodiments described further hereinbelow, product gases resulting from carbonization and product gases resulting from activation may be sent to different places within IP 250. For example, at least a portion of the carbonization product gases or a combustion product thereof, at least a portion of the activation product gases or a combustion product thereof, or at least a portion of both may be sent to SEGP 295. This contrasts with prior art stand-alone ACPPs where the activated carbon production plant itself comprises a combustion chamber/boiler wherein product gases 212 are combusted to generate heat/steam for the activation.

In embodiments, a portion of the activation and/or carbonization product gases is used as fuel for steam activation, carbonization and/or coal-heating and drying steps. In FIG. 2, product gases leaving activation step 209 are directed to the zone where carbonization and coal drying/heating (zones 208, 207) are performed. Product gases 212 leaving carbonization step 208 may be retained at a high temperature to prevent condensation of tars. Hot-gas booster fan 214 may be used to boost the pressure of combustible gases in product gas stream 212 or fines-reduced product gas stream 239 to yield boosted gas stream 239a. In embodiments, product gas 212, fines-reduced product gases 239/239a, a portion thereof, or a combination thereof is directed to drying/heating zone 207, activation zone 208, and/or carbonization zone 209 where the product gases are combusted (e.g. with additional air) to provide heat as necessary. For example, a portion of product gas 212 may be diverted via ACPA product gas recycle stream 217 and sent back to ACPA 211. Fractions of ACPA product gas recycle stream 217 may be sent to heating/drying zone 207, carbonization zone 208, and activation zone 209 via product gas recycle combustion streams 227, 228, and 229 respectively. Air may be added to combust with streams 227, 228, and/or 229 via air streams 224, 225, and 226 respectively. Additional fuel, as needed, may be added to zones 207, 208, and 209 of ACPA 211 via supplemental fuel streams 221, 222, and 223.

A separator upstream of booster fan 214 may be used to remove fine particles (fines) from the product gases from carbonization zone 208, activation zone 209, or both. The separator may comprise any means known to those of skill in the art whereby fines may be separated from the product gases, for example, cyclonization. In the embodiment of FIG. 2, for example, product gases 212 enter separator, e.g. cyclone, 215. Fines are removed from separator 215 via fines recycle stream 216. The fine carbonaceous particles may then be recycled to the activation or carbonization steps (not shown in FIG. 2).

In the IP of the present disclosure, precise temperature control, if required within the various zones or pieces of equipment of the ACPA, may be difficult to achieve by combustion of ACPA product gas recycle 217, as the quality of the product gas will vary with input quality of ACPP inlet 206. To overcome this issue, in embodiments, not all heat required within ACPA 211 is generated from combustion of product gases. Rather, a portion of the heat supply may be provided by combustion of supplementary gaseous/liquid fuel supplied to heating/drying zone 207, carbonization zone 208, and/or activation zone 209 via supplemental fuel streams 221, 222, and 223 respectively. The amount of combustion of supplemental fuel may be controlled to achieve the prescribed temperature in each of the zones or pieces of equipment in ACPP 285.

In the integrated plant, the portion of product gases not redirected to the activated carbon production equipment, i.e. remaining product gas stream 218, can be utilized in various ways. In FIG. 2, remaining product gas stream 218 is directed to combustion zone 230 of SEGP 295, where it is used as fuel, for example reburn (secondary combustion) fuel. In embodiments, remaining product gas stream 218 comprises at least a portion of activation product gases, at least a portion of carbonization product gases, or a combination thereof. The use of at least a portion of remaining product gas stream 218 as reburn fuel may be particularly advantageous as it may reduce the level of at least one contaminant in the flue gas. For example, use of at least a portion of remaining product gas stream 218 as reburn fuel may reduce SEGP 295 emissions of nitrogen oxide. In embodiments, the heat input of the portion of remaining product gas stream 218 directed to SEGP 295 is greater than about 0.1% of the total heat input of SEGP 295. In embodiments, the heat input of the portion of remaining product gas stream 218 directed to SEGP 295 is greater than about 0.3% of the total heat input of SEGP 295. In embodiments, the heat input of the portion of remaining product gas stream 218 sent to SEGP 295 is less than about 5% of the total heat input of SEGP 295. In alternative embodiments, the heat input of the portion of remaining product gas stream 218 sent to SEGP 295 is less than 2% of the total heat input of SEGP 295. In still other embodiments, the heat input of the portion of remaining product gas stream 218 sent to SEGP 295 is less than 1% of the total heat input of SEGP 295. In embodiments, the heat input of the portion of remaining product gas stream 218 directed to SEGP 295 is in the range of from 0.1% to about 5% of the total heat input of SEGP 295; from about 0.3% to about 2% of the total heat input of SEGP 295; from about 0.5% to about 2% of the total heat input of SEGP 295, from 1% to about 5% of the total heat input of SEGP 295; from about 0.1% to about 2% of the total heat input of SEGP 295; from about 0.3% to about 2% of the total heat input of SEGP 295; from about 0.5% to about 2% of the total heat input of SEGP 295 or from 1% to about 2% of the total heat input of SEGP 295.

In embodiments, product gases produced in activation zone 209, which activation product gases contain predominantly hydrogen and carbon monoxide, are used as reburn fuel in SEGP 295. The use of product gases from activation zone 209 as reburn fuel may reduce $NO_x$ emissions from solid fuel boiler 230. In embodiments, product gases produced in carbonization zone 208 from pyrolysis of high molecular weight carbonaceous material are introduced into a gas furnace or aftercombustor as further described hereinbelow. As previously mentioned, carbonization produces carbonization product gas and solid carbonized product, i.e. char. The char product produced as an intermediate step in the integrated activated carbon production has a high heating value. In embodiments, at least a portion of char produced in carbonization zone 208 is cofired with fuel in SEGP 295 to improve combustion. In embodiments, a portion of char produced in carbonization zone 208 is used in a separate process for the reduction of $NO_x$ in the lower-temperature regions of the boiler. $NO_x$ reduction may comprise low-temperature gasification which $NO_x$ levels by converting NO to $N_2$ upon contact of the $NO_x$-containing flue gas with char particles.

AfterCombustor

FIG. 3 is a schematic of another embodiment of an IP 250 according to the present disclosure for the coproduction of activated carbon and steam/electricity. In this embodiment, at least a portion of the remaining product gas stream 218 not recycled to the activated carbon production equipment is burned with air 238 in aftercombustor 219. At least a portion of furnace combustion gas 234 may be directed to convective pass 231 or other position upstream of air heater 240 of SEGP 295, whereby the energy in furnace combustion gas 234 is extracted. In this manner, no additional heat-transfer equipment is present other than what is already available at SEGP 295. In embodiments, the heat input of furnace combustion gas 234 directed to SEGP 295 from aftercombustor 219 of ACPP 285 is greater than about 0.1% of the total heat input of SEGP 295 or greater than about 0.3% of the total heat input of SEGP 295. In embodiments, the heat input of furnace combustion gas 234 from aftercombustor 219 of ACPP 285 is less than about 5% of the total heat input of SEGP 295, less than 2%, or alternatively less than 1% of the total heat input of SEGP 295. Table 2 of Example 2 hereinbelow presents exemplary flow rates and temperatures for various streams according to an embodiment as in FIG. 3. In embodiments, the heat input of furnace combustion gas 234 from aftercombustor 219 of ACPP 285 is in the range of from 0.1% to about 5%, from 0.3% to about 5%, from 0.5% to about 5%, from 1% to about 5%, from 0.1% to 2%, from 0.3% to 2%, from 0.5% to 2%, or from 1% to 2%.

Cleaning ACPP Process Gas

In a stand-alone activated carbon production plant, product gases from carbonization and activation steps are combusted in an associated boiler to generate steam. The flue gases from this boiler contain pollutants including nitrogen oxides, sulfur oxides, trace metals, and particulates. Depending on regulatory requirements, the flue gas must be cleaned to varying degrees before discharge into the atmosphere via a stack. The flue gas may be cleaned as known to those of skill in the art. Typically, a particulate removal device such as a fabric filter or an electrostatic precipitator is used for reducing particulate emissions, and a wet or dry flue gas desulfurization device is used for reducing $SO_2$ emissions. These requirements impart additional costs in terms of equipment required in a stand-alone plant as well as additional operating costs.

In the IP of the present disclosure, at least a portion of the product gases from carbonization zone 208, activation zone 209, or both is introduced into the combustion zone of a SEGP to act as a reburn fuel or is combusted in an aftercombustor (gas furnace) and the hot combusted gases advantageously introduced into SEGP 295, for example, into the convection pass section 231 or upstream of a flue gas cleaning section of the steam/electricity generation plant 295. The injection location for product gases from the activated carbon plant in all embodiments is thus before at least one air pollution control device of SEGP 295, thus eliminating the need for stand-alone pollution control equipment dedicated to the activated carbon production process. The at least one pollution control device may be selected from the group consisting of selective catalytic control systems for nitrogen oxide control, selective non-catalytic control systems for nitrogen oxide control, particulate collection devices (such as, for example, fabric filters, electrostatic precipitators, particulate scrubbers, and cyclones) for particulate emission control, desulfurization scrubbers for sulfur oxide control, including without limitation, sulfur scrubbers such as dry scrubbers, semi-dry scrubbers, wet flue gas desulfurization devices, and combinations thereof.

In embodiments, the amount of combusted gases from the activated carbon plant, in cases where an aftercombustor is used, or the amount of combusted gases that would result from the combustion of the product gases from the carbonization and activation steps of the activated carbon plant if the product gases are directed to the combustion section of the SEGP, is less than about 5% of the total flue gas flowing through the SEGP; alternatively, less than 2%; alternatively less than 1%. In embodiments, the amount of combusted gases from the activated carbon plant, in cases where an aftercombustor is used, or the amount of combusted gases that would result from the combustion of the product gases from the carbonization and activation steps of the activated carbon plant if the product gases are directed to the combustion section of the SEGP, is greater than about 0.1% of the total flue gas flowing through the SEGP. In embodiments, the amount of combusted gases from the activated carbon plant, in cases where an aftercombustor is used, or the amount of combusted gases that would result from the combustion of the product gases from the carbonization and activation steps of the activated carbon plant if the product gases are directed to the combustion section of the SEGP, is greater than about 0.3% of the total flue gas flowing through the SEGP. Thus, in embodiments, the amount of combusted gases from the activated carbon plant, in cases where an aftercombustor is used, or the amount of combusted gases that would result from the combustion of the product gases from the carbonization and activation steps of the activated carbon plant if the product gases are directed to the combustion section of the SEGP, is in the range of from 0.1% to 5%, from 0.3% to 5%, from 0.5% to 5%, from 1% to 5%, from 0.1% to 2%, from 0.3% to 2%, from 0.5% to 2%, from 1% to 2%, from 0.1 to 1%, from 0.3% to 1%, from 0.5% to 1%, or may be greater than 1%.

EXAMPLES

The invention having been generally described, the following examples are given as particular aspects of the invention and to demonstrate the practice and advantages thereof. It is understood that the examples are given by way of illustration and are not intended to limit the specification of the claims to follow in any manner.

Example 1

Lignite

A database comprising 1317 as-fired samples of Center lignite was analyzed. The average, standard deviation, maximum, minimum and selected percentiles for ash, sulfur, heating value, and selected ash constituents are included in Table 1.

TABLE 1

Statistical analysis of Ash, Sulfur, Heating Value, and Selected Ash Constituents.

|  | Ash[1] | S[1] | Heating value[2] | CaO[3] | MgO[3] | $K_2O$[3] | $Na_2O$[3] | B/A[4] |
|---|---|---|---|---|---|---|---|---|
| Average | 9.64 | 1.0 | 6578 | 13.2 | 4.0 | 1.3 | 4.4 | 0.7 |
| Standard Deviation | 2.0 | 0.27 | 179 | 3.17 | 0.8 | 0.4 | 2.2 | 0.34 |
| Max | 25.5 | 2.6 | 7101 | 24.0 | 7.1 | 2.3 | 13.0 | 2.5 |
| Min | 5.0 | 0.5 | 5852 | 6.8 | 2.3 | 0.2 | 0.6 | 0.3 |
| 90th Perc. | 12.51 | 1.29 | 6820 | 19.9 | 5.7 | 1.9 | 8.7 | 1.26 |
| 10th Perc. | 7.06 | 0.72 | 6359 | 9.7 | 3.0 | 0.6 | 2.0 | 0.44 |
| 45th Perc. | 9.33 | 0.90 | 6552 | 12.2 | 3.8 | 1.4 | 4.1 | 0.59 |
| 55th Perc. | 9.75 | 0.94 | 6592 | 12.7 | 4.0 | 1.4 | 4.6 | 0.64 |
| 50th Perc. | 9.53 | 0.93 | 6572 | 12.5 | 3.89 | 1.4 | 4.4 | 0.61 |

[1]Weight percent on an as-fired basis.
[2]Heating express as BTU/lb on an as-fired basis.
[3]Weight percent of the ash, elemental weight percent express as equivalent oxide.
[4]B/A is the base to acid ratio of the ash constituents (B/A = [$Na_2O$ + MgO + CaO + $K_2O$ + FeO]/[$SiO_2$ + $Al_2O_3$ + $TiO_2$]).

Figure 4:
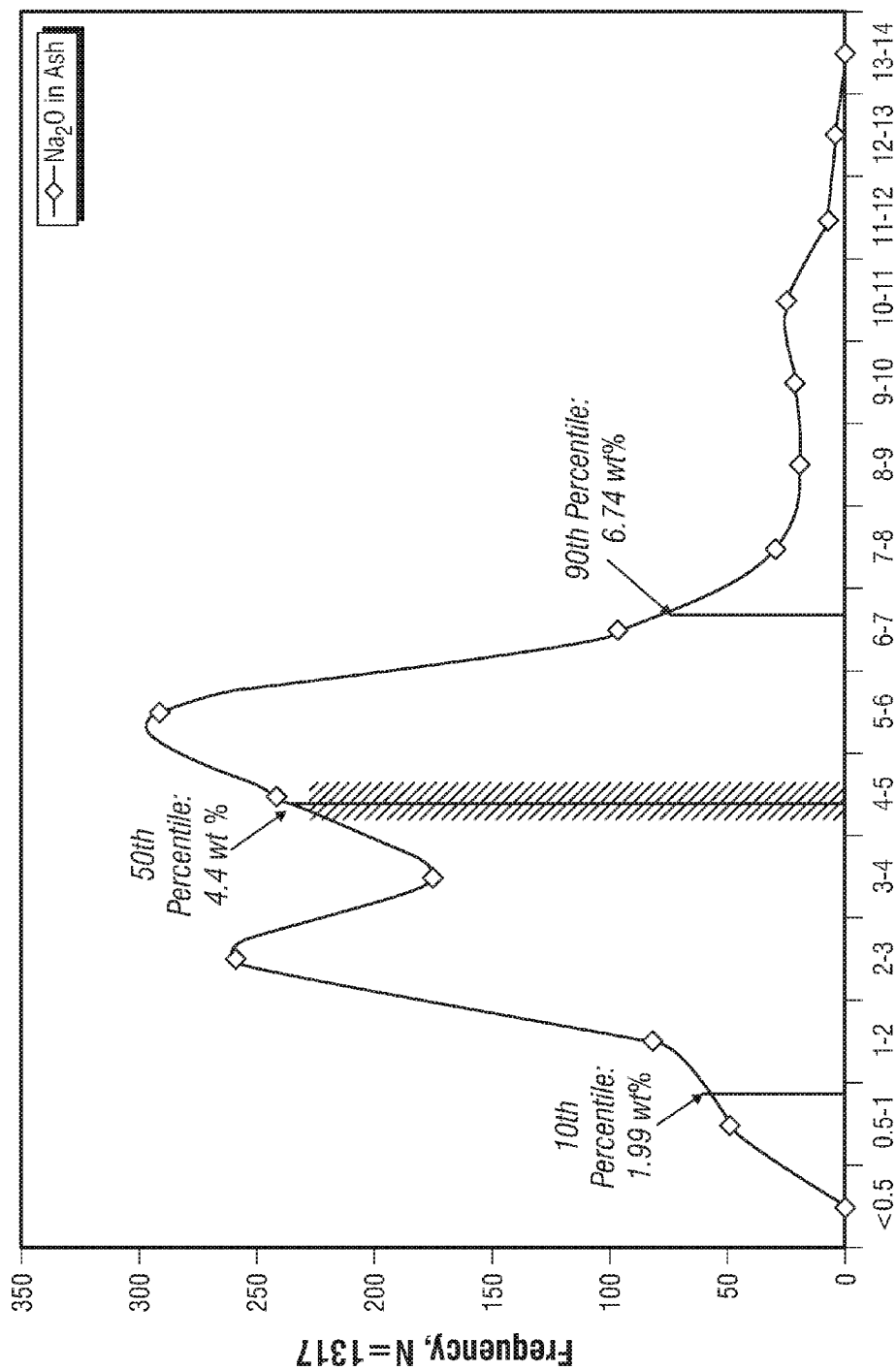
FIG. 4 is a frequency distribution of sodium (expressed as equivalent oxide) in ash from as-fired samples of suitable lignite.
Figure 5:
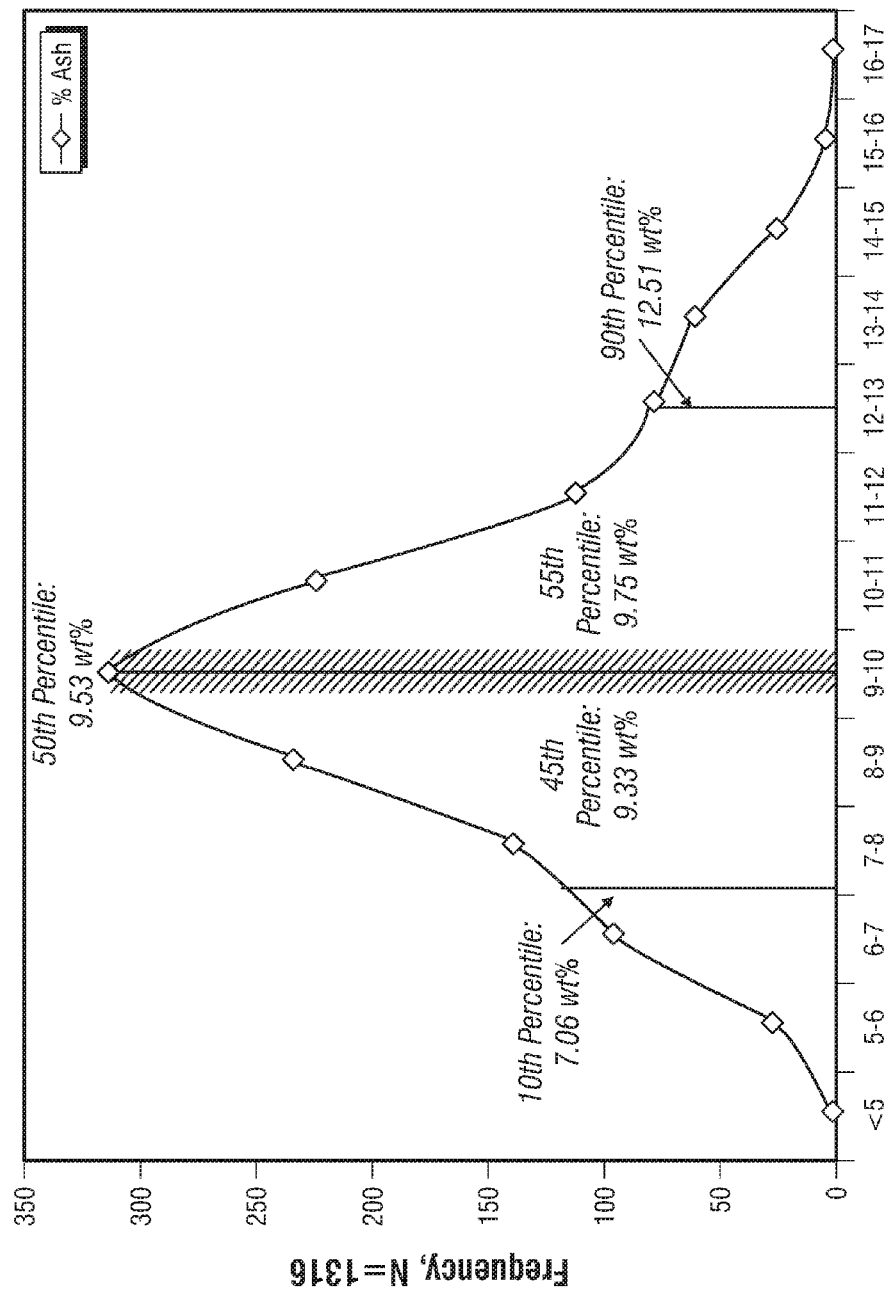
FIG. 5 is a frequency distribution of ash (weight percent on an as-fired basis) in as-fired samples of suitable lignite.
Figure 6:
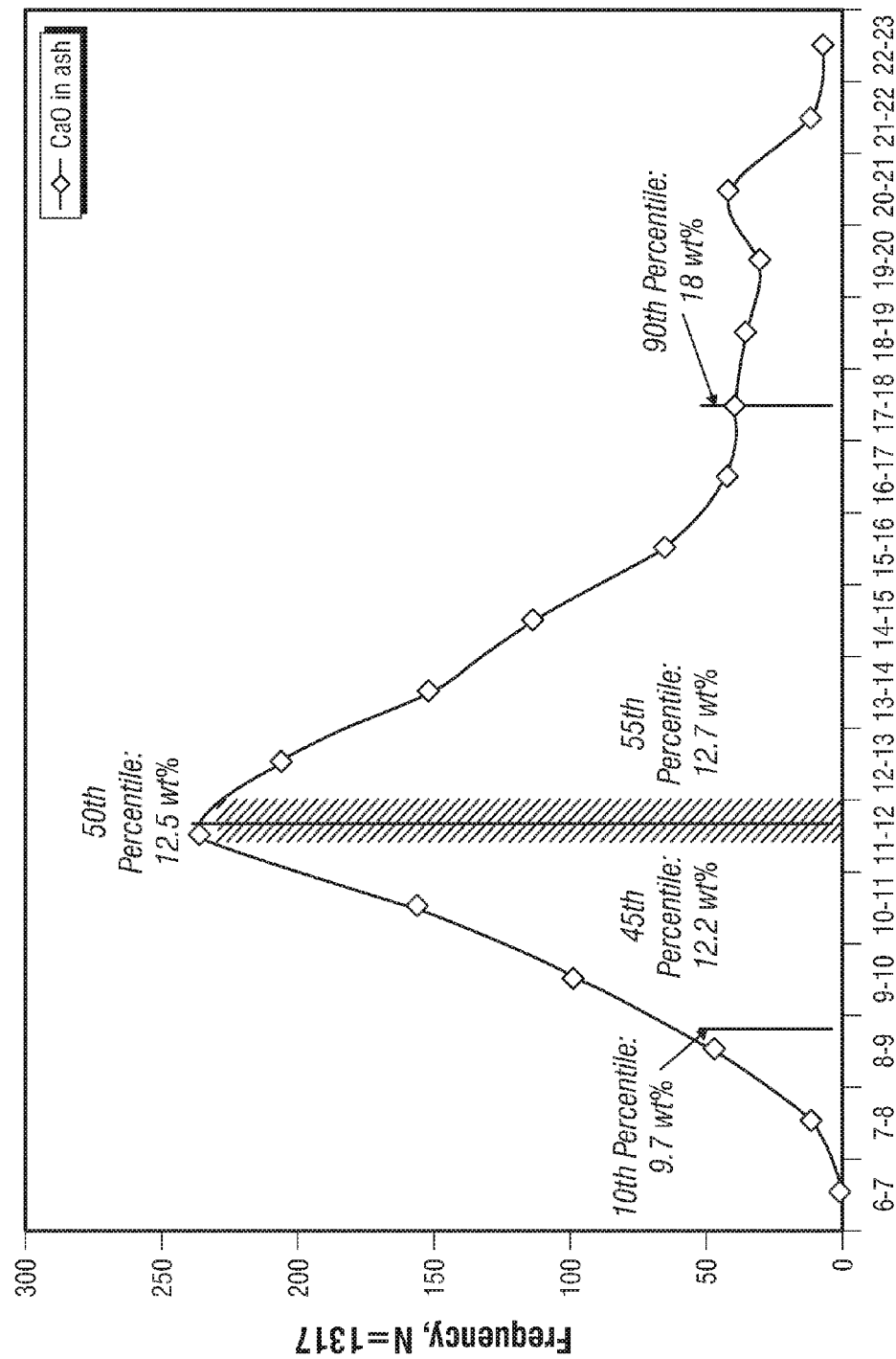
FIG. 6 is a frequency distribution of calcium (expressed as equivalent oxide) in ash from as-fired samples of suitable lignite.
Figure 7:
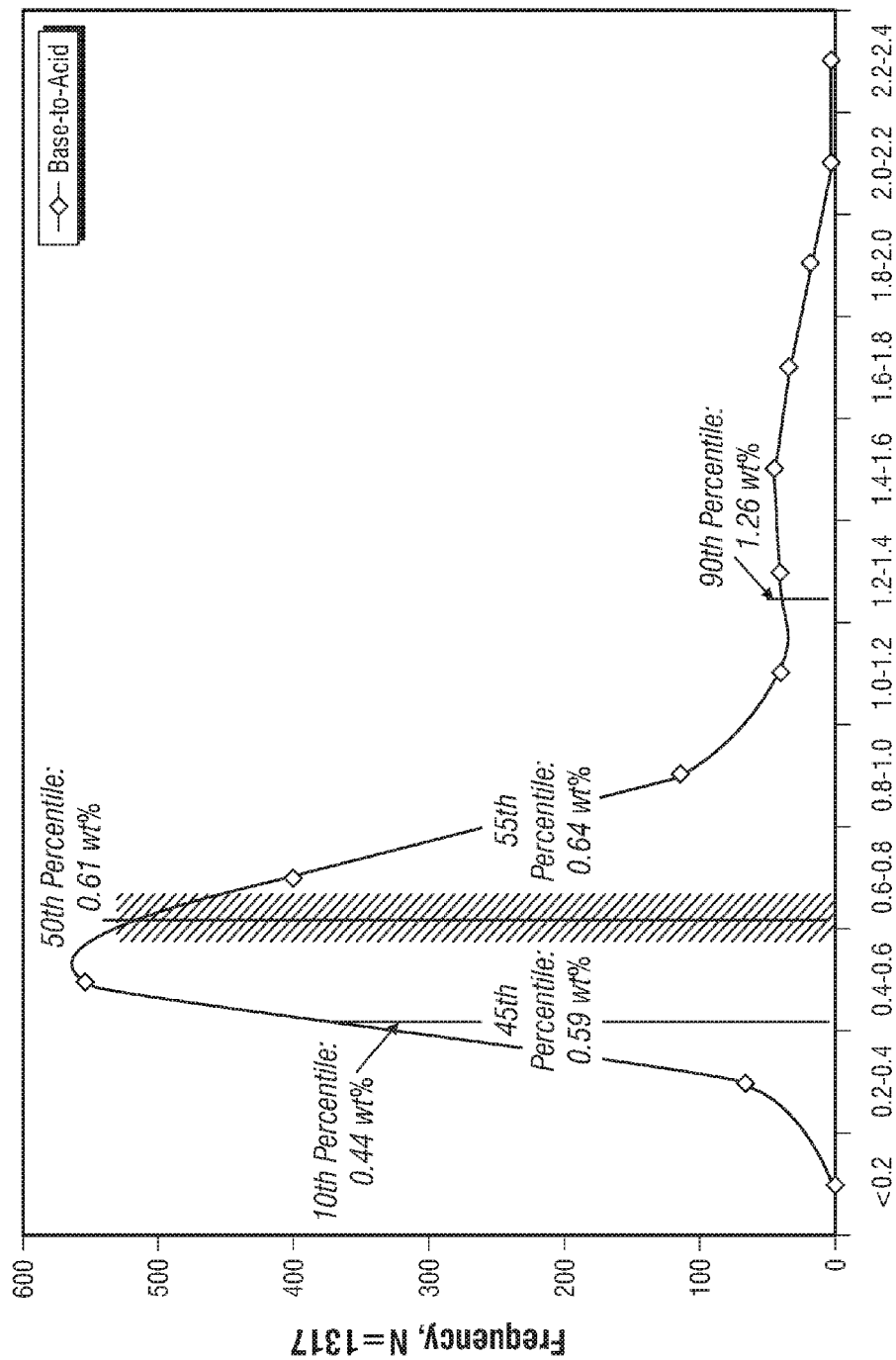
FIG. 7 is a frequency distribution of the base-to-acid component ratio of the ash derived from as-fired samples of suitable lignite.
Figure 8:
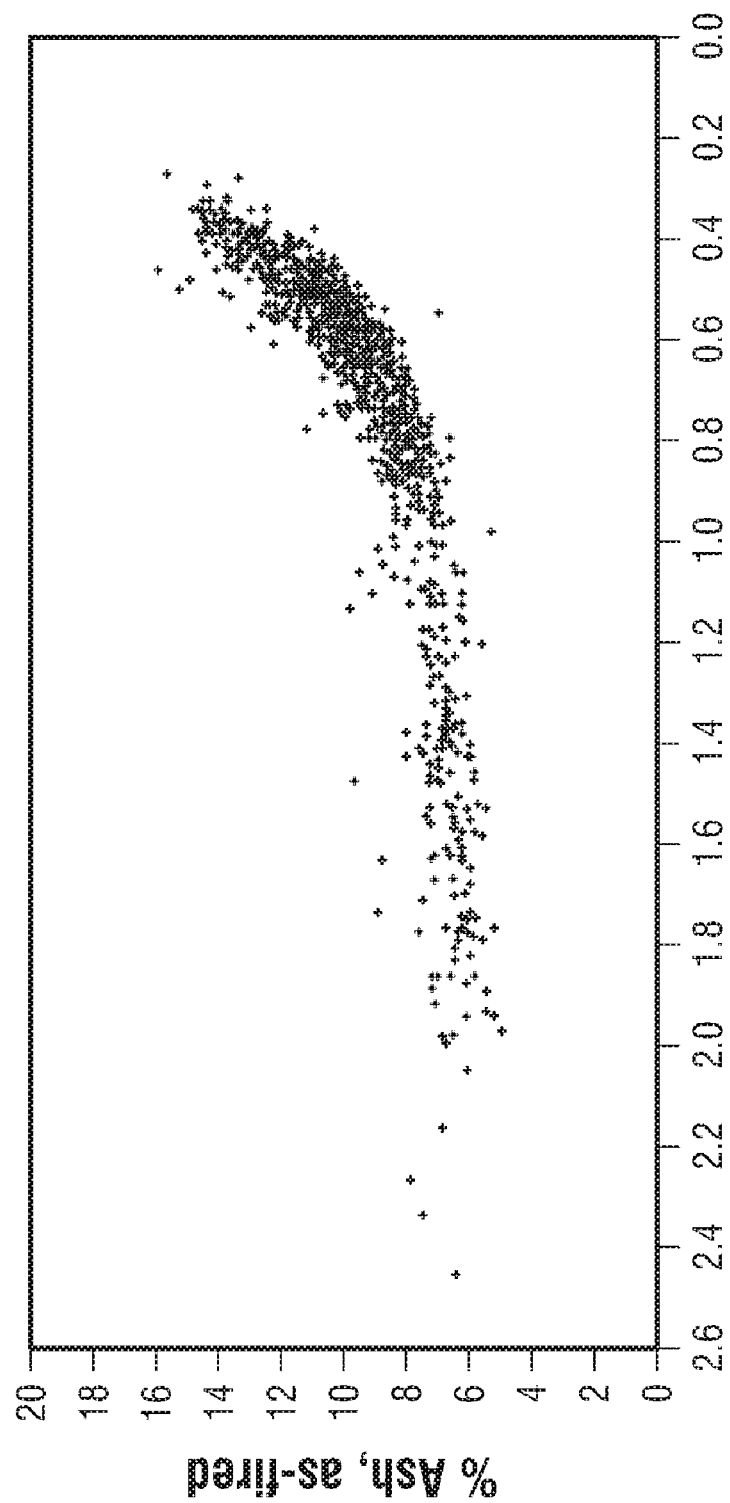
FIG. 8 is a plot of ash content versus base to acid ratio for as-fired samples of suitable lignite.

The results of the analysis show that the lignite ash has an average sodium content of 4.4%; however, there is a multi-modal distribution of sodium levels in the coal ash, as shown in FIG. 4 which is a plot of the distribution of sodium oxide in Center lignite ash. FIG. 5 shows the frequency distribution of ash constituents. The higher ash content values were not included in the plot. However, a sample with 25.5% ash is included in the database. FIG. 6 is a frequency distribution of calcium. FIG. 7 is distribution frequency plot of the base-to-acid ratio of the ash derived from the coals in the Center lignite as-fired database. The distributions need to be used along with the average, standard deviation, minimum and maximum information to assess ash behavior. FIG. 8 shows the relationship between ash content and the base to acid ratio. Desirable coals for the activated carbon may have a base to acid ratio greater than or equal to about 0.4 and an ash content less than or equal to about 15%.

Example 2

Process Flow Parameters

In embodiments, ACPA 211 of IP 250 comprises a multiple hearth furnace. Flow rates and temperatures of an exemplary process according to an embodiment according to FIG. 2 comprising a MHF are presented in Table 2.

TABLE 2

Process Flow Parameters

| Stream | Temp, °F. | lb/hour | SCFM | ACFM |
|---|---|---|---|---|
| 200—Wet coal feed | 60 | 15700 | | |
| 221 + 222 + 223 + 227 + 228 + 229 Multiple Hearth Furnace (MHF) Fuel | 60 | 100 | 10 | 10 |
| 224 + 225 + 226 MHF Burner Air + Injection Air | 60 | 870 | 200 | 200 |
| 237 MHF Steam | 250 | 5000 | 700 | 950 |
| 212 MHF Exhaust Gas | 825 | 50000 | 10000 | 25000 |
| 238 Post Combustor Air Supply | 60 | 12000 | 2500 | 2500 |
| 213 Hot Product | 1650 | 5000 | | |
| 234 Post Combustor Exhaust Gas | 1700 | 50000 | 12500 | 50000 |

Example 3

Carbonization of Biomass, Coal, and Blend of Coal and Biomass

Production of activated carbon was carried out in a pilot-scale rotary kiln system. Carbonization is first described and steam activation of carbonized char is described thereafter. High potassium sunflower hulls were from a sunflower processing plant in North Dakota, Center lignite coal received from BNI coal. Both sunflower hulls and center lignite coals were sized to nominal −⅛-in.+10-mesh material. A hull and coal blend (HCB) comprising a one to one mass ratio basis of sunflower hull to center lignite coal was carbonized, along with sunflower hull alone and coal alone. Carbonization was performed at 600° C. in the rotary kiln system. The test matrix of the carbonization process is given in Table 3.

TABLE 3

Test Matrix for Carbonization Tests in Rotary Kiln

| Feed Material | Carbonization Temperature, °C. | Reactor |
|---|---|---|
| Sunflower Hull | 600 | Rotary kiln |
| Coal | 600 | Rotary kiln |
| Hull and Coal Blend | 600 | Rotary kiln |

The results of the proximate, ultimate, and bulk ash chemistry analyses performed on sunflower hull and coal are presented in Table 4 and Table 5.

TABLE 4

Analysis of High Potassium Sunflower Hull

| | As Sampled | Moisture Free |
|---|---|---|
| Proximate Analysis, wt % | | |
| Moisture Content | 6.82 | NA* |
| Volatile Matter | 73.84 | 79.24 |
| Fixed Carbon | 17.33 | 18.60 |
| Ash | 2.01 | 2.16 |

TABLE 4-continued

Analysis of High Potassium Sunflower Hull

| | As Sampled | Moisture Free |
|---|---|---|
| Ultimate Analysis, wt % | | |
| Hydrogen | 6.98 | 6.68 |
| Carbon | 44.26 | 47.50 |
| Nitrogen | 1.25 | 1.34 |
| Sulfur | 0.13 | 0.14 |
| Oxygen | 45.37 | 42.18 |
| Ash | 2.01 | 2.16 |
| Ash Analysis, wt % | | |
| $SiO_2$ | | 5.50 |
| $Al_2O_3$ | | 0.40 |
| $Fe_2O_3$ | | 0.15 |
| $TiO_2$ | | 0.04 |
| $P_2O_5$ | | 7.40 |
| CaO | | 11.30 |
| MgO | | 9.58 |
| $Na_2O$ | | 0.00 |
| $K_2O$ | | 59.89 |
| $SO_3$ | | 4.42 |
| BaO | | 0.02 |
| SrO | | 0.03 |

*Not applicable.

TABLE 5

Analysis of Center Lignite Coal

| | As Sampled | Moisture Free |
|---|---|---|
| Proximate Analysis, wt % | | |
| Moisture Content | 22.17 | NA* |
| Volatile Matter | 40.56 | 52.11 |
| Fixed Carbon | 31.72 | 40.75 |
| Ash | 5.56 | 7.14 |
| Ultimate Analysis, wt % | | |
| Hydrogen | 5.92 | 4.44 |
| Carbon | 50.71 | 65.16 |
| Nitrogen | 0.98 | 1.26 |
| Sulfur | 0.79 | 1.02 |
| Oxygen | 36.04 | 20.98 |
| Ash | 5.56 | 7.14 |
| Ash Analysis, wt % | | |
| $SiO_2$ | | 13.80 |
| $Al_2O_3$ | | 8.50 |
| $Fe_2O_3$ | | 9.48 |
| $TiO_2$ | | 0.26 |
| $P_2O_5$ | | 0.13 |
| CaO | | 25.10 |
| MgO | | 6.88 |
| $Na_2O$ | | 12.35 |
| $K_2O$ | | 0.57 |
| $SO_3$ | | 21.60 |
| BaO | | 0.62 |
| SrO | | 0.69 |

*Not applicable.

Carbonization was carried out on a semi-continuous basis. The feed material was loaded into the feeder hopper and refilled as needed. Table 6 shows the operating conditions, and characteristics of the char produced. Product yield was higher for carbonization tests using Center lignite coal compared to sunflower hulls. The product char yield was 22.33, 41.8, and 30.62% respectively for sunflower hull, center lignite coal, and HCB. Tables 4 and 5 show that volatile content of sunflower hulls is higher than that of center lignite coal, and carbon content of center lignite coal is higher than that of sunflower hull. The carbonization process drives out moisture and volatiles from the feed material leaving carbon in the char. The difference in volatile matter, and fixed carbon contents of sunflower hull and coal are reasons for variation in char yield. The iodine number is a simple measure of surface area on activated carbons and was measured according to ASTM D4607-94. The iodine number tracks the internal surface area (micropores) of the sorbent as absorption of iodine in mg $I_2$/g carbon.

TABLE 6

Test Conditions for Carbonization Tests of Sunflower Hulls, Center Lignite Coal, and Hull and Coal Blend, −⅛-in. +10-Mesh Particle-Size Fraction

| Test No.: | 1 | 2 | 3 |
|---|---|---|---|
| Feed Material | Sunflower Hull | Center Lignite | Hull and Coal Blend |
| Feed Moisture, wt % | 6.82 | 22.17 | N/A |
| Temperature, ° C. | 600 | 600 | 600 |
| Tube Incline, ° | 1 | 1 | 1 |
| Tube Speed, rpm | 2 | 2 | 2 |
| Feed Rate, lb/hr | 10 | 10 | 10 |
| Material Processed, lb | 30 | 50 | 40 |
| Char Recovered, lb | 6.70 | 20.90 | 12.25 |
| Product Yield, % | 22.33 | 41.8 | 30.62 |
| Iodine No., mg $I_2$/g | 175 | 291 | 110 |

Example 4

Steam Activation of Carbonized Char

Steam activation of carbonized char was carried out with three different types of char described in Table 7. Sample 4 comprises char derived from coal alone; sample 5 comprises char derived from carbonization of a 1:1 mass ratio of sunflower hull:coal (HCB char); and sample 6 comprises a 1:1 mass ratio of coal char:sunflower hull char (i.e. sample 6 is a blend of individually-derived chars).

TABLE 7

Test Matrix for Steam Activation Tests in Rotary Kiln

| Feed Material | Activation Temperature, ° C. | Reactor | Steam Rate, lb/hr | Residence Time, min |
|---|---|---|---|---|
| Coal Char (#4) | 875 | rotary kiln | 4 | 90 |
| Blend Char[1] (#5) | 875 | rotary kiln | 4 | 90 |
| Coal and Hull char[2] (#6) | 875 | rotary kiln | 4 | 90 |

[1]Blend char is derived from coal:hull = 1:1 (mass basis) of raw material
[2]Coal char:hull char = 1:1 (mass basis)

Steam activation was carried at around 5.5 lb/hr of char feed rate and 4 lb/hr of steam flow rate. Activation was carried out at 875° C. with residence time of 90 minutes. Table 8 shows the operating conditions for the steam activation tests performed using chars described in Table 7. From iodine number comparison, activation of HCB char (Sample #5) produced more surface area compared to activation of char derived from coal alone (Sample #4) and activation of a 1:1 mass ratio blend of individually carbonized sunflower hull char and coal char (Sample #6). Activated carbon derived from at least a portion of sunflower hulls appears to comprise an increased surface area relative to fully coal-derived activated carbon.

TABLE 8

Test Conditions for Optimization Test of Char Derived from Sunflower Hull, Coal, and Blend of Coal and Hull

| Feed Material | Coal Char #4 | Blend Char #5 | Coal and Hull Char #6 |
|---|---|---|---|
| Activation Temp., ° C. | 875 | 875 | 875 |
| Tube Incline, ° | 1 | 1 | 1 |
| Tube Speed, rpm | 1.31 | 1.31 | 1.31 |
| Est. Res. Time, min | 90 | 90 | 90 |
| Char Feed Rate, lb/hr | 5.5 | 5.5 | 5.5 |
| Steam Rate, lb/hr | 4 | 4 | 4 |
| Char Processed, lb | 10 | 9.15 | 10 |
| Carbon Recovered, lb | 6.45 | 5.2 | 6.7 |
| Iodine No., mg $I_2$/g | 803 | 964 | 815 |

As mentioned hereinabove, the iodine number for activated carbon is a parameter that is used as a measure of the surface area of the product. Previous pilot-scale tests (not shown here) show activation temperature is a key variable impacting product surface area. Pilot-scale tests also confirmed that longer residence time increases the iodine number of activated carbon. An activated carbon with a surface area in the range of 800 to 965 mg $I_2$/g product was obtained from the activation of char produced by carbonization of 1:1 mass ratio sunflower hull:Center North Dakota lignite. Steam activation of Center North Dakota lignite alone yielded iodine numbers of 500 to 800 mg $I_2$/g under similar carbonization and activation conditions.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The discussion of a reference is not an admission that it is prior art to the present invention, especially any reference that may have a publication date after the priority date of this application. The disclosures of all patents, patent applications, and publications cited herein are hereby incorporated by reference, to the extent they provide exemplary, procedural or other details supplementary to those set forth herein.

What is claimed is:

1. A system for the coproduction of activated carbon and boiler-produced steam, the system comprising:

a boiler in which a solid fuel from a solid fuel source is thermally converted via combustion with air to produce boiler-produced steam and flue gas, the boiler comprising a boiler-produced steam outlet and at least one flue gas outlet;

an activated carbon production apparatus, the activated carbon production apparatus comprising a carbonization zone in which a carbonaceous material is carbonized to produce carbonization gases and char, the carbonization zone comprising carbonaceous material inlet, a char outlet and a carbonization gas outlet; and an activation zone in which char is activated with activation steam to produce activated carbon and activation gases, the activation zone comprising an activated carbon outlet, an activation gas outlet, and an activation steam inlet; and piping connecting the solid fuel source to the carbonaceous material inlet, whereby a portion of the solid fuel source may be introduced into the carbonaceous material inlet.

2. The system of claim 1 wherein the solid fuel comprises coal, biomass, or a combination thereof.

3. The system of claim 2 wherein the coal is lignite.

4. The system of claim 3 wherein the lignite comprises a base to acid ratio of greater than or equal to about 0.4 and an ash content of less than or equal to about 15%.

5. The system of claim 1 wherein the carbonization zone and the activation zone are distinct zones within the same reactor.

6. The system of claim 5 wherein the reactor is a multiple hearth furnace.

7. The system of claim 1 wherein the carbonization zone and the activation zone arc in separate reactors.

8. The system of claim 7 comprising at least one rotary kiln.

9. The system of claim 1 further comprising an activated carbon inlet whereby a portion of the activated carbon is injected into the flue gas.

10. The system of claim 1 wherein the boiler-produced steam outlet and the activation steam inlet are fluidly connected, whereby a portion of the boiler-produced steam may be introduced into the activation zone.

* * * * *

UNITED STATES PATENT AND TRADEMARK OFFICE
CERTIFICATE OF CORRECTION

| | | |
|---|---|---|
| PATENT NO. | : 7,981,835 B2 | |
| APPLICATION NO. | : 12/120639 | |
| DATED | : July 19, 2011 | |
| INVENTOR(S) | : Srivats Srinivasachar et al. | |

It is certified that error appears in the above-identified patent and that said Letters Patent is hereby corrected as shown below:

Claim 6, column 24, line 11, replace "arc" with --are--.

Signed and Sealed this
Thirteenth Day of September, 2011

David J. Kappos
*Director of the United States Patent and Trademark Office*